US012647759B2

(12) United States Patent
Wang et al.

(10) Patent No.: US 12,647,759 B2
(45) Date of Patent: Jun. 2, 2026

(54) CLOSED LOOP AIRCRAFT LEVEL DYNAMIC SHAPER WITH FAIRNESS

(71) Applicant: GOGO BUSINESS AVIATION LLC, Broomfield, CO (US)

(72) Inventors: Zhiyong Wang, Vernon Hills, IL (US); Yashvardhan Singh, Erie, CO (US); Yolanda Nicole Andrade, Chicago, IL (US)

(73) Assignee: GOGO BUSINESS AVIATION LLC, Broomfield, CO (US)

( * ) Notice: Subject to any disclaimer, the term of this patent is extended or adjusted under 35 U.S.C. 154(b) by 252 days.

(21) Appl. No.: 18/231,167

(22) Filed: Aug. 7, 2023

(65) Prior Publication Data

US 2025/0056194 A1 Feb. 13, 2025

(51) Int. Cl.
*H04W 4/42* (2018.01)

(52) U.S. Cl.
CPC .................................... *H04W 4/42* (2018.02)

(58) Field of Classification Search
CPC ....... H04W 4/42; H04W 72/54; H04W 24/02; H04W 28/0231; H04W 28/0268; H04W 72/56; H04W 84/06; H04B 7/18506; H04L 47/24
See application file for complete search history.

(56) References Cited

U.S. PATENT DOCUMENTS

2016/0360547 A1* 12/2016 Johnson .............. H04L 47/2483
2018/0316799 A1* 11/2018 Shaw ...................... H04L 41/40

FOREIGN PATENT DOCUMENTS

EP 3591935 A1 1/2020
WO WO-2021/159330 A1 8/2021

OTHER PUBLICATIONS

International Patent Application No. PCT/US2024/041158, International Search Report and Written Opinion, mailing date of Nov. 6, 2024.

* cited by examiner

*Primary Examiner* — Ayodeji O Ayotunde
(74) *Attorney, Agent, or Firm* — Holland & Hart LLP

(57) ABSTRACT

Systems and methods for dynamically metering network access in a vehicle network are disclosed. An exemplary method includes periodically receiving one or more performance metrics of one or more communication links that support wireless communications for one or more networked computing devices onboard a vehicle, wherein the one or more performance metrics fluctuate over time, periodically determining a link quality indicator based upon the one or more performance metrics, and periodically transmitting the link quality indicator to a traffic shaper system to cause the traffic shaper system to dynamically allocate bandwidth among the one or more networked computing devices based upon the link quality indicator.

20 Claims, 10 Drawing Sheets

Figure 2:
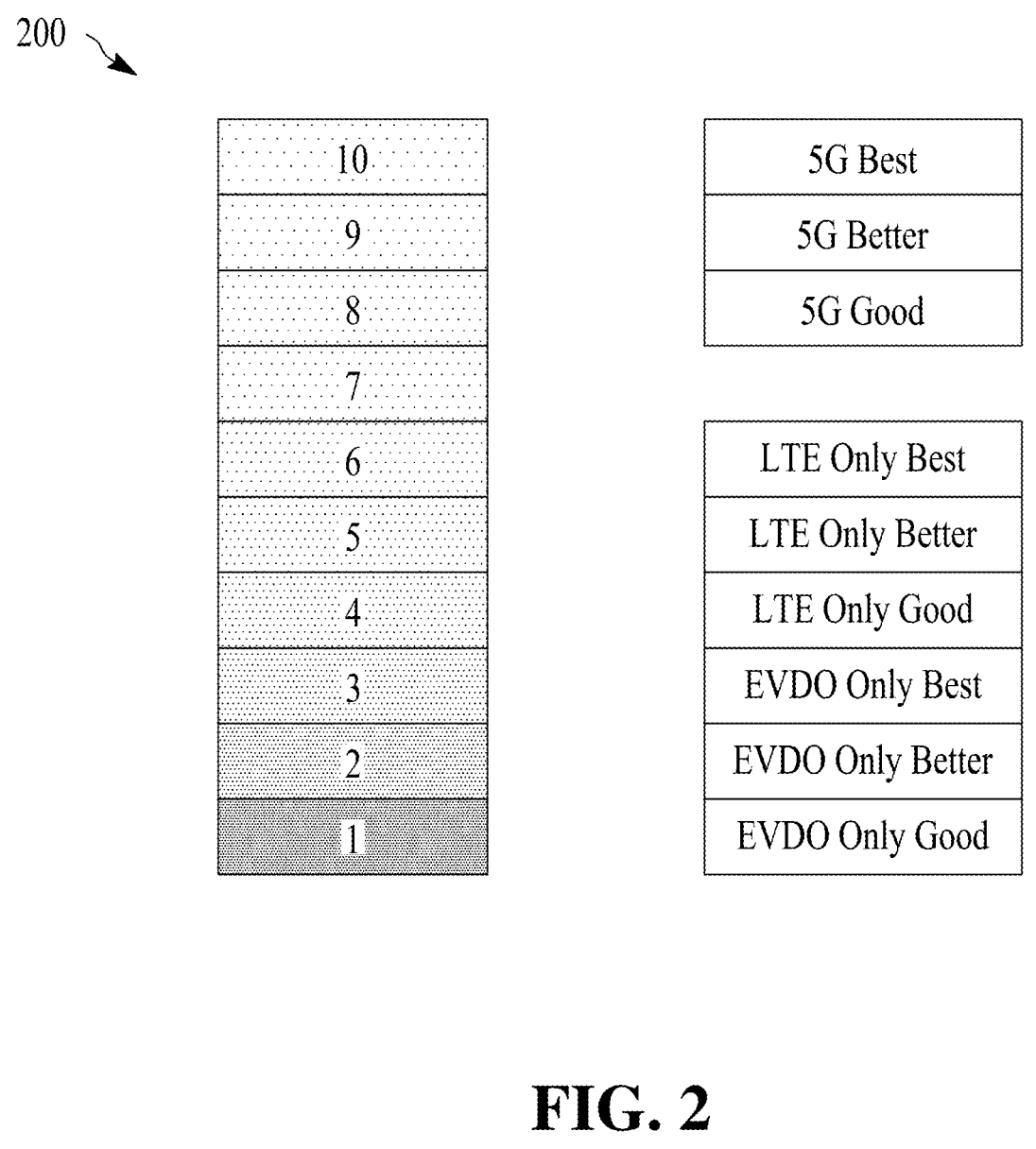

200

| |
|---|
| 10 |
| 9 |
| 8 |
| 7 |
| 6 |
| 5 |
| 4 |
| 3 |
| 2 |
| 1 |

| |
|---|
| 5G Best |
| 5G Better |
| 5G Good |

| |
|---|
| LTE Only Best |
| LTE Only Better |
| LTE Only Good |
| EVDO Only Best |
| EVDO Only Better |
| EVDO Only Good |

Periodically receive performance metrics for communication link(s)

504

Periodically determine link quality indicator(s) for the communication link(s)

506

Periodically transmit link quality indicator(s) to traffic shaper system

CLOSED LOOP AIRCRAFT LEVEL DYNAMIC SHAPER WITH FAIRNESS

FIELD OF THE DISCLOSURE

The present disclosure is related generally to network communications. In particular, the present disclosure relates to dynamic network traffic shaping.

BACKGROUND

Providing network access to computing devices on a travelling aircraft may be challenging. An aircraft's communication link, such as cellular or satellite, provides a limited bandwidth connection that must be shared among many onboard computing devices. Conventional techniques apply a static traffic shaping scheme that attempts to fairly allocate the bandwidth among the computing devices. The conventional static traffic shaping schemes provide a fixed allocation of bandwidth that is not adjusted over time. However, as the aircraft travels, the quality and available bandwidth of the communication link can vary widely due to the distance to the cell site, background interference, number of user equipment in the cell sector, etc. If the quality of the communication link improves, the fixed allocation of bandwidth underutilizes the current capacity of the communication link. On the other hand, if the quality of the communication link degrades, the fixed allocation of bandwidth to each computing device may exceed the current capacity of the communication link; this can result in uneven allocation of bandwidth among the computing devices.

SUMMARY

The present aspects can relate to, inter alia, systems and methods for dynamic network shaping.

In one aspect, a computer-implemented method for dynamically metering network access in a vehicle network may be provided. For example, in one instance, the computer-implemented method may include: (1) periodically receiving, by one or more processors, one or more performance metrics of one or more communication links that support wireless communications for one or more networked computing devices onboard a vehicle, wherein the one or more performance metrics fluctuate over time; (2) periodically determining, by the one or more processors, a link quality indicator based upon the one or more performance metrics; and (3) periodically transmitting, by the one or more processors, the link quality indicator to a traffic shaper system to cause the traffic shaper system to dynamically allocate bandwidth among the one or more networked computing devices based upon the link quality indicator.

In another aspect, a ground station system for dynamically metering network access in a vehicle network may be provided. The ground station system may include one or more processors and one or more non-transitory memories. For example, the ground station system may include one or more processors configured to: (1) periodically receive one or more performance metrics of one or more communication links that support wireless communications for one or more networked computing devices onboard a vehicle, wherein the one or more performance metrics fluctuate over time; (2) periodically determine a link quality indicator based upon the one or more performance metrics; and (3) periodically transmit the link quality indicator to a traffic shaper system to cause the traffic shaper system to dynamically allocate bandwidth among the one or more networked computing devices based upon the link quality indicator.

Advantages will become more apparent to those of ordinary skill in the art from the following description of the preferred aspects, which have been shown and described by way of illustration. As will be realized, the present aspects can be capable of other and different aspects, and their details are capable of modification in various respects. Accordingly, the drawings and description are to be regarded as illustrative in nature and not as restrictive.

BRIEF DESCRIPTION OF THE DRAWINGS

FIG. 2 depicts an exemplary link quality indicator scale according to aspects of the present disclosure.

Figure 1A:
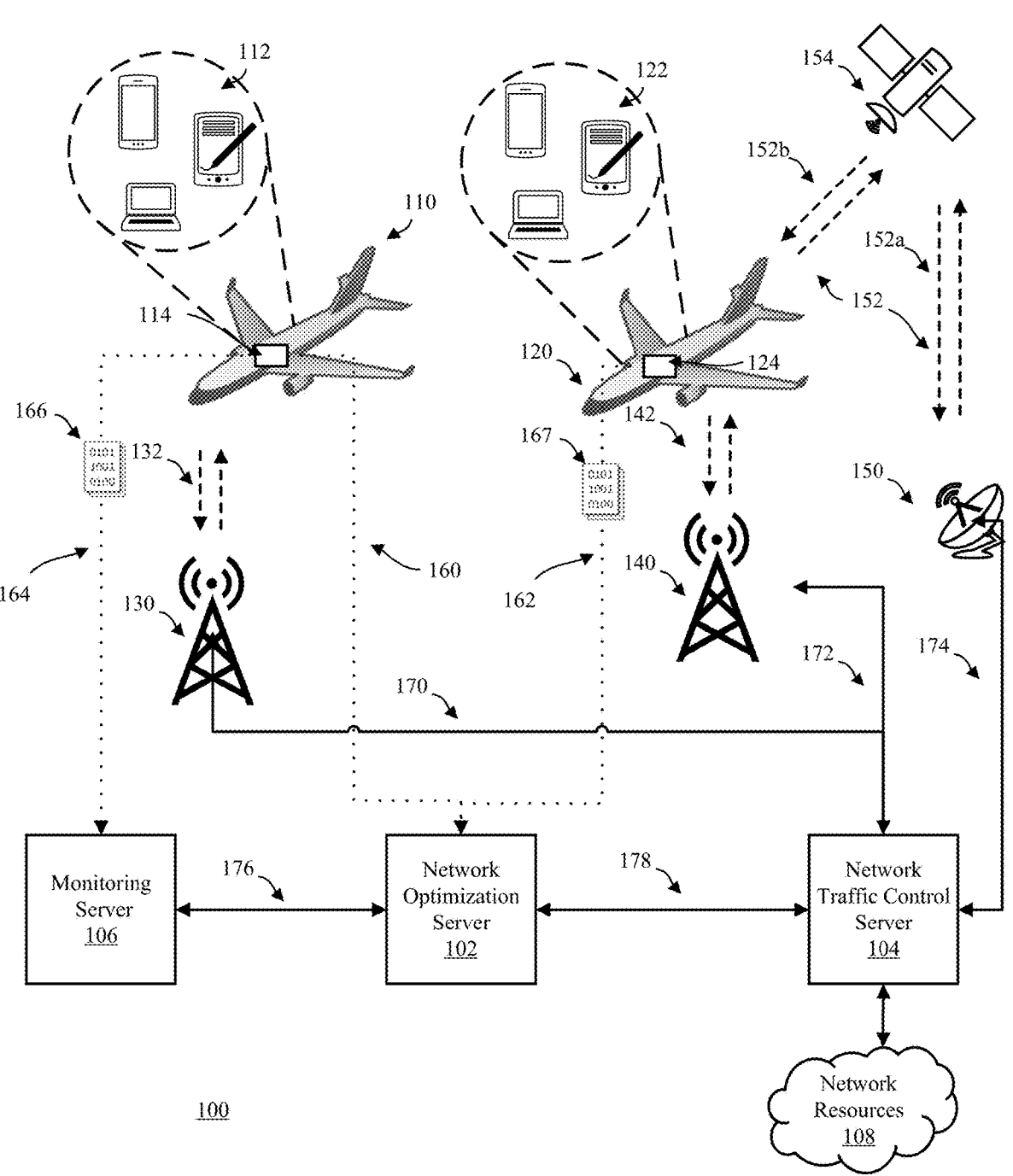
FIGS. 1A and 1B depict a vehicle communication network environment according to aspects of the present disclosure.

The figures depict embodiments of this disclosure for purposes of illustration only. One skilled in the art will readily recognize from the following discussion that alternate embodiments of the structures and methods illustrated herein may be employed without departing from the principles set forth herein. The figures are not to scale. Instead, they are drawn to clarify aspects of this disclosure. Connecting lines or connectors shown in the various figures presented are intended to represent example functional relationships, physical couplings, or logical couplings between the various elements. In general, the same reference numbers will be used throughout the drawing(s) and accompanying written description to refer to the same or like parts.

DETAILED DESCRIPTION

Reference will now be made in detail to the various embodiments and aspects of the present disclosure illustrated in the accompanying drawings. Wherever possible, the same or like reference numbers will be used throughout the drawings to refer to the same or like features. Certain terminology is used in the following description for convenience only and is not limiting.

Exemplary Vehicle Communication Network Environment

Figure 1B:
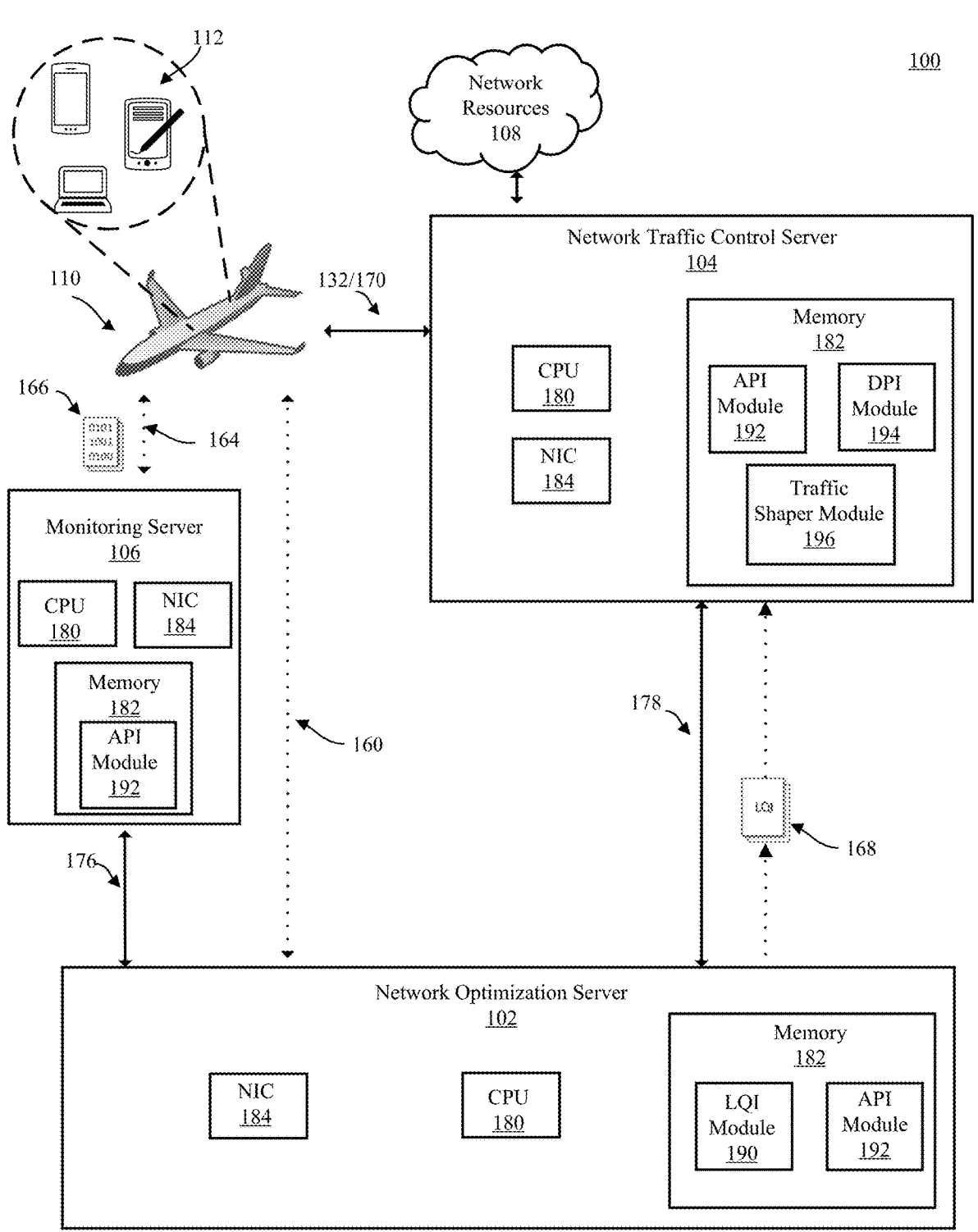

FIGS. 1A and 1B depict a vehicle communication network environment, in accordance with various aspects of the present disclosure. While FIGS. 1A and 1B illustrate various components that can be included in the network environment, additional components can be added and components which are illustrated, can be removed.

As illustrated in FIG. 1A, the network environment 100 may include a network optimization server 102, a network traffic control server 104, and/or a monitoring server 106. The network environment 100 may also include network resources 108, such as the Internet. The network environment 100 may also include one or more vehicles, for example, an aircraft 110 and an aircraft 120. Although examples of a vehicle are depicted as an aircraft or airplane, it is envisioned that the vehicle may be any vehicle, for example, a bus, a train, a subway, a helicopter, a ship, a balloon, etc. The aircraft 110 may include passengers that are communicating with the network resources 108 using one or more computing devices 112. Likewise, the aircraft 120 can include passengers that are communicating with the network resources 108 using one or more computing devices 122. The computing devices 112 and the computing devices 122 can be any type of computing device such as a mobile device (e.g., a cell phone, a smart phone, a personal digital assistant (PDA), or a tablet such as an iPad™), a laptop, an Internet appliance, a digital versatile disk (DVD) player, a compact disc (CD) player, a Blu-ray disk player, a digital video recorder, a Blu-ray player, a gaming console, a personal video recorder, a set top box, a headset or other wearable device, or any other type of computing device.

The aircraft 110 may be equipped with an on-board node 114, such as an Auxiliary Computer Power Unit (ACPU), that supports communications external to the aircraft 110. Likewise, the aircraft 120 may be equipped with an on-board node 124, such as an ACPU, that supports communications external to the aircraft 120. The on-board node 114 and/or the on-board node 124 may be coupled to one or more modems communicatively connected to one or more external communication links. The one or more external communication links may correspond to a particular communication protocol (e.g., GSM, CDMA, UMTS, LTE, WiMAX, 5G, 6G, etc.) and/or to a particular frequency band (e.g., Ka band, Ku band, L band, S band, Cellular band, AWS Band, PCS band, an unlicensed band, etc.).

The network environment 100 may also include base stations 130 and 140 and satellite base station 150. Base stations 130 and 140 may comprise NodeBs, eNodeBs, and/or gNBs. For example, as illustrated, the aircraft 110 may be communicatively coupled to a base station 130 via an external communication link 132. The aircraft 120 may be communicatively coupled to a base station 140 via an external communication link 142. Additionally, for example, the aircraft 120 may be communicatively coupled to a satellite base station 150 via an external communication link 152. The external communication link 152 may include one or more satellites 154 that acts as a relay between the satellite base station 150 and the aircraft 120. Accordingly, the external communication link 152 may include a first communication link 152a between the satellite base station 150 and the satellite 154 and a second communication link 152b between the satellite 154 and the aircraft 120.

The base stations 130 and 140 and the satellite base station 150 may communicate with the network traffic control server 104 via backhaul communication links 170, 172, and 174. Backhaul communication links 170, 172, and 174 may comprise one or more of fiber optic, copper, microwave, and/or other suitable technologies. The network traffic control server 104 provides and regulates access to the network resources 108.

In one aspect, the on-board node 114 and the on-board node 124 may generate or collect performance metrics 166 and 167 for one or more of the external communication links 132, 142, and 152 in near real time. The performance metrics 166 and 167 may include performance data for the uplink and/or downlink for one or more the external communication links 132, 142, and 152, such as (1) signal-to-noise ratio (SNR); (2) received signal strength indicator (RSSI); (4) packet count, retransmits, and error rate; (5) bit error rate; (6) estimated bandwidth; (7) cellular site distance; (8) number of user equipment (UEs) in cellular sector; (9) adaptive coding scheme; (10) adaptive modulation scheme; and (11)

estimated bandwidth. The performance metrics may also include vehicle-level attributes, such as: (1) vehicle position, e.g., latitude, longitude, elevation, country, or region; (2) vehicle modem IP address; (3) vehicle modem IMSI number; (4) vehicle identification number; (5) vehicle network translated IP address/subnets; (6) number of connected computing devices 112 or 122; (7) IP and/or MAC addresses of connected computing devices 112 or 122; (8) connected cellular site ID and/or sector ID; (9) connected satellite beam ID; and (10) vehicle distance to connected base station 130 or 140 or satellite 154.

The on-board nodes 114 and 124 may periodically send their performance metrics 166 and 167 to the monitoring server 106 or to the network optimization server 102 via the external communication links 132, 142, and 152. As illustrated, the on-board node 114 sends its performance metrics 166 to the monitoring server 106 via path 164 or to the network optimization server 102 via path 160. And the on-board node 124 sends its performance metrics 167 to the network optimization system via path 162. The on-board nodes 114 and 124 may send their performance metrics 166 and 167 every 5 seconds to 20 seconds, for example, although other intervals may be used.

In another aspect, the base stations 130 and 140 and the satellite base station 150 may generate or collect performance metrics 166 and 167 for one or more of the external communication links 132, 142, and 152. The network optimization server 102 or monitoring server 106 may receive the performance metrics 166 and 167 from the base stations 130 and 140 and the satellite base station 150.

FIG. 1B illustrates additional aspects of the network environment 100. The network optimization server 102, network traffic control server 104, and monitoring server 106 may comprise one or more servers, cloud computing devices, and/or network devices, such as routers, switches, network appliances, etc.

Each of the network optimization server 102, network traffic control server 104, and monitoring server 106 may comprise one or more central processing units (CPU) 180. The CPU 180 may comprise a CPU, a graphics processing unit (GPU), a digital signal processor (DSP), an application specific integrated circuit (ASIC), a field programmable gate array (FPGA), or other suitable processor.

Each of the network optimization server 102, network traffic control server 104, and monitoring server 106 may comprise one or more network interface cards (NIC) 184. The NIC 184 may comprise an Ethernet interface, a WAN interface, or a WiFi interface.

Each of the network optimization server 102, network traffic control server 104, and monitoring server 106 may comprise one or more memories 182. The memory 182 may comprise volatile memories, e.g., a random access memory (RAM) or cache, and non-volatile memories, e.g., a read only memory (ROM), flash memory, hard drives, compact disc (CD), digital versatile disc (DVD), Blue-Ray disc, etc. The memory 182 may store software, logic, data, and/or computer instructions. For example, the memory 182 of the network optimization system may comprise a link quality indicator (LQI) module 190 and an application programming interface (API) module 192. The memory 182 of the network traffic control server 104 may comprise the API module 192, a deep packet inspection (DPI) module 194, and a traffic shaper module 196. The DPI module 194 may comprise commercially-available software, such as Solar-Winds NetFlow Traffic Analyzer, open source software, such as nDPI, or a proprietary solution. The traffic shaper module 196 may comprise commercially-available software, such as SoftPerfect Bandwidth Manager, open source software, such as MasterShaper, or a proprietary solution.

The monitoring server 106 may communicate with the network optimization server 102 over link 176, and the network optimization server 102 may communicate with the network traffic control server 104 over link 178. Links 176 and 178 may be WAN, LAN, wired, and/or wireless links. Communication over links 176 and 178 may be encrypted and rely upon a standard protocol, e.g., HTTPS or SSH, or a proprietary protocol.

In one aspect, monitoring server 106, the network optimization server 102, and the network traffic control server 104 may comprise an API module 192. The API module 192 may facilitate the transfer of data between the monitoring server 106 and the network optimization server 102 and between the network optimization server 102 and the network traffic control server 104. The API module 192 may be implemented with representation state transfer (REST) or simple object access protocol (SOAP) architecture.

In one aspect, the monitoring server 106 and/or network optimization server 102 may periodically receive performance metrics 166 from aircraft 110 through path 164 or path 160. The monitoring server 106 may forward the performance metrics 166 to the network optimization server 102.

In one aspect, the LQI module 190 may periodically process the performance metrics 166 to generate one or more LQIs 168. The LQI 168 may be a score that indicates the relative quality of a communication link. LQIs 168 may be assigned to individual communication links or to an aggregation of communication links. LQIs 168 may be separately assigned to the uplink and the downlink channels of a communication link. The LQI module 190 may process one or more sets of performance metrics 166 to generate the LQI 168. The LQI module 190 may use the mean, median, maximum, or minimum of data in the sets of performance metrics 166 to calculate the LQI 168.

The network optimization server 102 may periodically transmit the LQI 168 to the network traffic control server 104. For example, the network optimization server 102 may transmit the LQI 168 to the network traffic control server 104 every 60 seconds, although different intervals may be used.

The network traffic control server 104 may act as a gateway to manage the network traffic transferred between the computing devices 112 and network resources 108 via external communication link 132 and backhaul communication link 170. The traffic shaper module 196 may allocate and limit the bandwidth for each of the computing devices 112. The traffic shaper module 196 may identify each of the computing devices 112 by IP address, token, or some other identifier. The traffic shaper module 196 may divide the total available bandwidth equally among the computing devices, for example. As another example, traffic shaper module 196 may provide additional bandwidth to certain computing devices 112, such as those who pay for premium network service. The traffic shaper module 196 may buffer and delay traffic that exceeds the allocated bandwidth for a given computing device 112. The traffic shaper module 196 may receive LQIs 168 and dynamically reallocate bandwidth based upon the current quality of the external communication link 132.

The DPI module 194 may inspect the network traffic to identify the application associated with the traffic. The DPI module 194 may inspect OSI layers 3 through 7 of the packet headers and/or the packet payload. The traffic shaper module 196 may apply different bandwidth limits to different application traffic. For example, the traffic shaper module 196 may throttle the bandwidth of peer-to-peer file sharing traffic while providing additional bandwidth to video streaming traffic to implement quality of service (QOS).

Exemplary Link Quality Indicator Scale

FIG. 2 depicts an LQI scale 200, in accordance with various aspects of the present disclosure. While FIG. 2 illustrates an exemplary LQI scale, the LQI 168 can be calculated using a number of different algorithms relying upon one or more performance metrics 166 as input data. For example, the LQI 168 may be based upon the cellular communication protocol, e.g., 5G, LTE, EVDO, etc. The LQI 168 may also be based upon the communication link quality, which may be determined by the RSSI, SNR, number of UEs in the cell sector, adaptive coding scheme, adaptive modulation scheme, etc. Although the illustrated LQI scale 200 may apply to cellular communication links, other LQI scales may apply to satellite communication links.

In one aspect, the LQI scale 200 may range from 1 to 10, with 1 being the lowest quality communication link and 10 being the highest quality communication link. As illustrated, an LQI 168 of 10 corresponds to 5G Best, 9 corresponds to 5G Better, 8 corresponds to 5G Good, 6 corresponds to LTE Only Best, 5 corresponds to LTE Only Better, 4 corresponds to LTE Only Good, 3 corresponds to EVDO Only Best, 2 corresponds to EVDO Only Better, and 1 corresponds to EVDO Only Good.

Exemplary Traffic Shaper Application

Figure 3A:
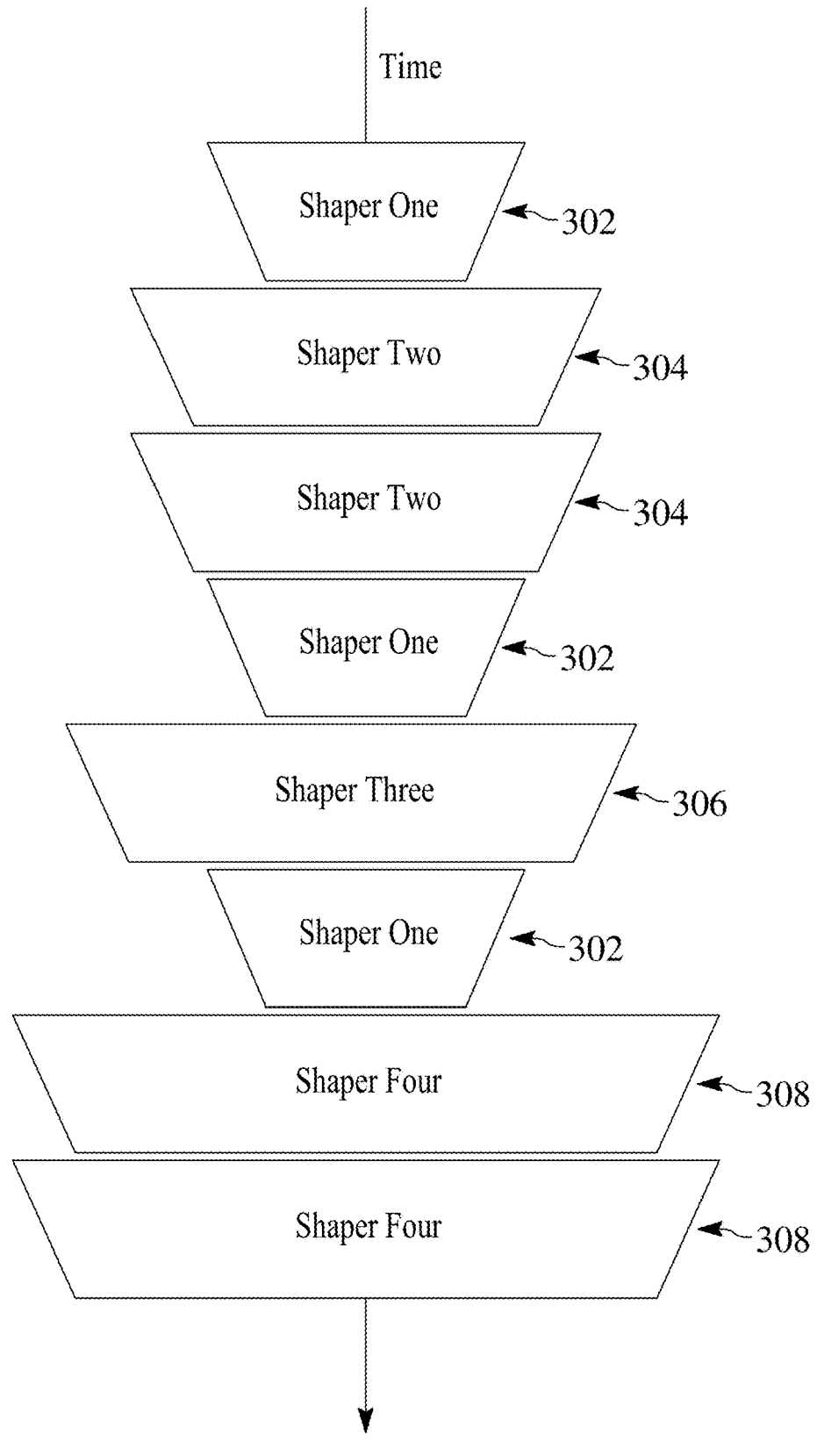
FIG. 3A depicts various traffic shapers generated and applied by the traffic shaper according to aspects of the present disclosure.

FIG. 3A depicts various traffic shapers generated and applied by the traffic shaper module 196, in accordance with various aspects of the present disclosure. While FIG. 3A illustrates four different traffic shapers, i.e., shaper one 302, shaper two 304, shaper three 306, and shaper four 308, any number of traffic shapers may be used.

In one aspect, the traffic shaper module 196 may apply different traffic shapers as time elapses. As illustrated in FIG. 3A, the traffic shaper module 196 may apply shaper one 302, then shaper two 304 twice, then shaper one 302, then shaper three 306, then shaper one 302, and then shaper four 308 twice.

In one aspect, the traffic shapers may correspond to one or more LQIs 168. For example, shaper one 302 may be applied when the LQI 168 is 1 or 2, shaper two 304 may be applied when the LQI 168 is 3 to 5, shaper three 306 may be applied when the LQI 168 is 6 to 8, and shaper four 308 may be applied when then LQI 168 is 9 or 10.

In one aspect, the traffic shapers may have different maximum uplink and/or downlink bandwidths. For example, shaper one 302 may enforce a maximum downlink bandwidth of 3 Mbps and a maximum uplink bandwidth of 1.8 Mbps, shaper two 304 may enforce a maximum downlink bandwidth of 300 Mbps and a maximum uplink bandwidth of 75 Mbps, shaper three 306 may enforce a maximum downlink bandwidth of 1 Gbps and a maximum uplink bandwidth of 500 Mbps, and shaper four 308 may enforce a maximum downlink bandwidth of 10 Gbps of a maximum downlink bandwidth of 5 Gbps.

Exemplary Allocation of Bandwidth Among Computing Devices Over Time

Figure 3B:
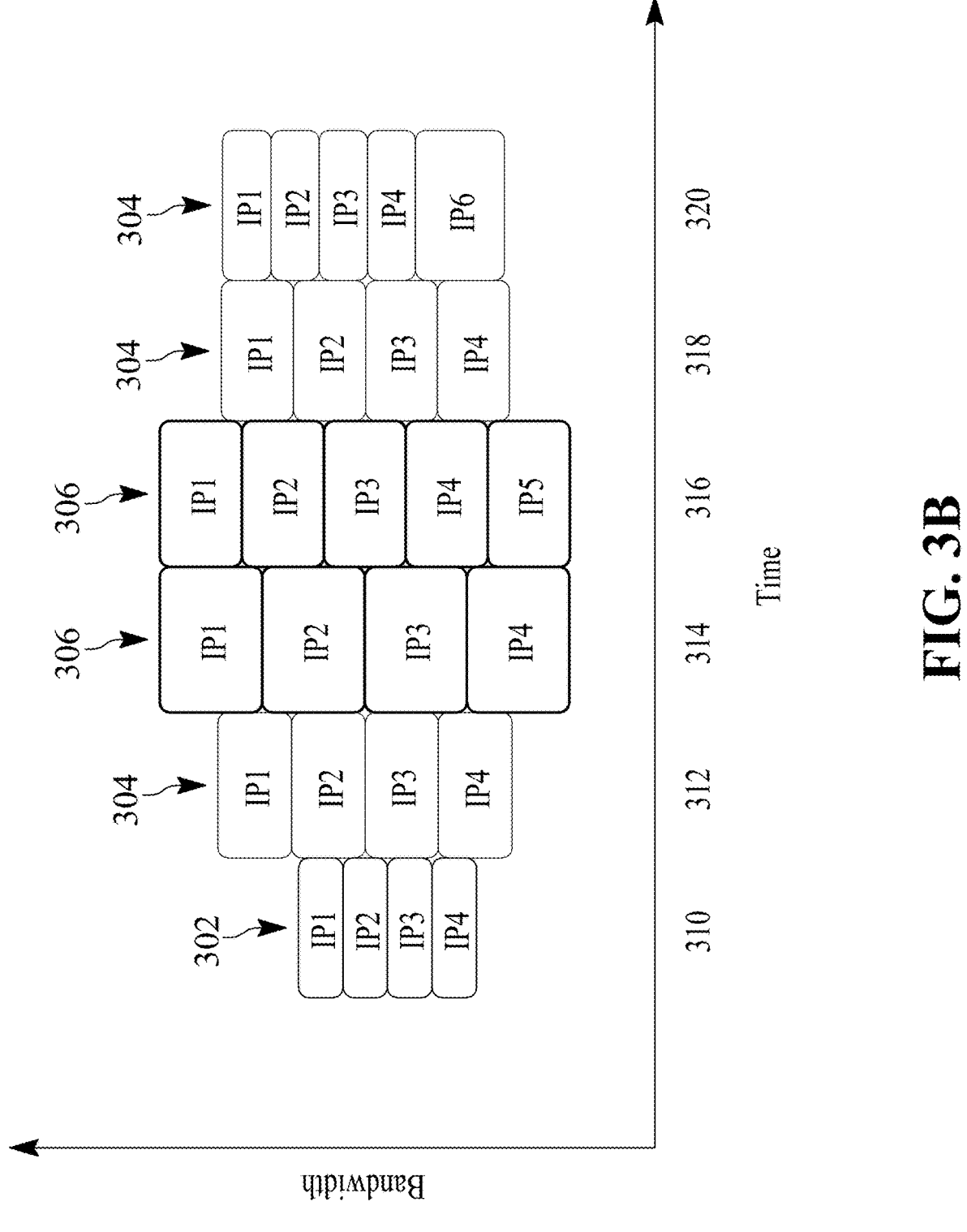
FIG. 3B depicts varying allocation of bandwidth among computing devices according to aspects of the present disclosure.

FIG. 3B depicts varying allocation of available bandwidth among computing devices by the traffic shaper module 196, in accordance with various aspects of the present disclosure. Communication link bandwidth is depicted on the Y-axis, while time is depicted on the X-axis.

For example, at time 310, the traffic shaper module 196 may apply shaper one 302 and may evenly divide the available bandwidth among four computing devices IP1, IP2, IP3, and IP4. At time 312, the traffic shaper module 196 may apply shaper two 304, and thus the bandwidth share of each computing device IP1-IP4 may increase. At time 314, the traffic shaper module 196 may apply shaper three 306, and thus the bandwidth share of each computing device IP1-IP4 may increase again. At time 316, an additional computing device IP5 may join the vehicle network; thus, the traffic shaper module 196 may reallocate the bandwidth evenly among the five computing devices IP1-IP5. At time 318, the traffic shaper module 196 may apply shaper two 304 and computing device IP5 may leave the computing network; thus, thus, the traffic shaper module 196 may reallocate the bandwidth evenly among the four remaining computing devices IP1-IP4. At time 320, an additional computing device IP6 may join the vehicle network and be given priority access; thus, computing device IP6 is allocated a greater share of bandwidth compared to computing devices IP1-IP4. In one aspect, each time 310-320 may have a duration of 60 seconds, although shorter and longer time durations are also possible.

Vehicle Traveling Between Cells in an Exemplary Vehicle Communication Network

FIGS. 4A-4D depict an aircraft as it progresses from one cell to another cell, in accordance with various aspects of the present disclosure. While FIGS. 4A-4D depict two cells 402 and 404 and no satellite, the vehicle communication network 100 may have any number of cells and satellites.

In one aspect, the on-board node 124 may transmit performance metrics 167 to the monitoring server 106 over link 162. The on-board node 124 may transmit the performance metrics 167 every 5 to 20 seconds, for example.

Figure 4A:
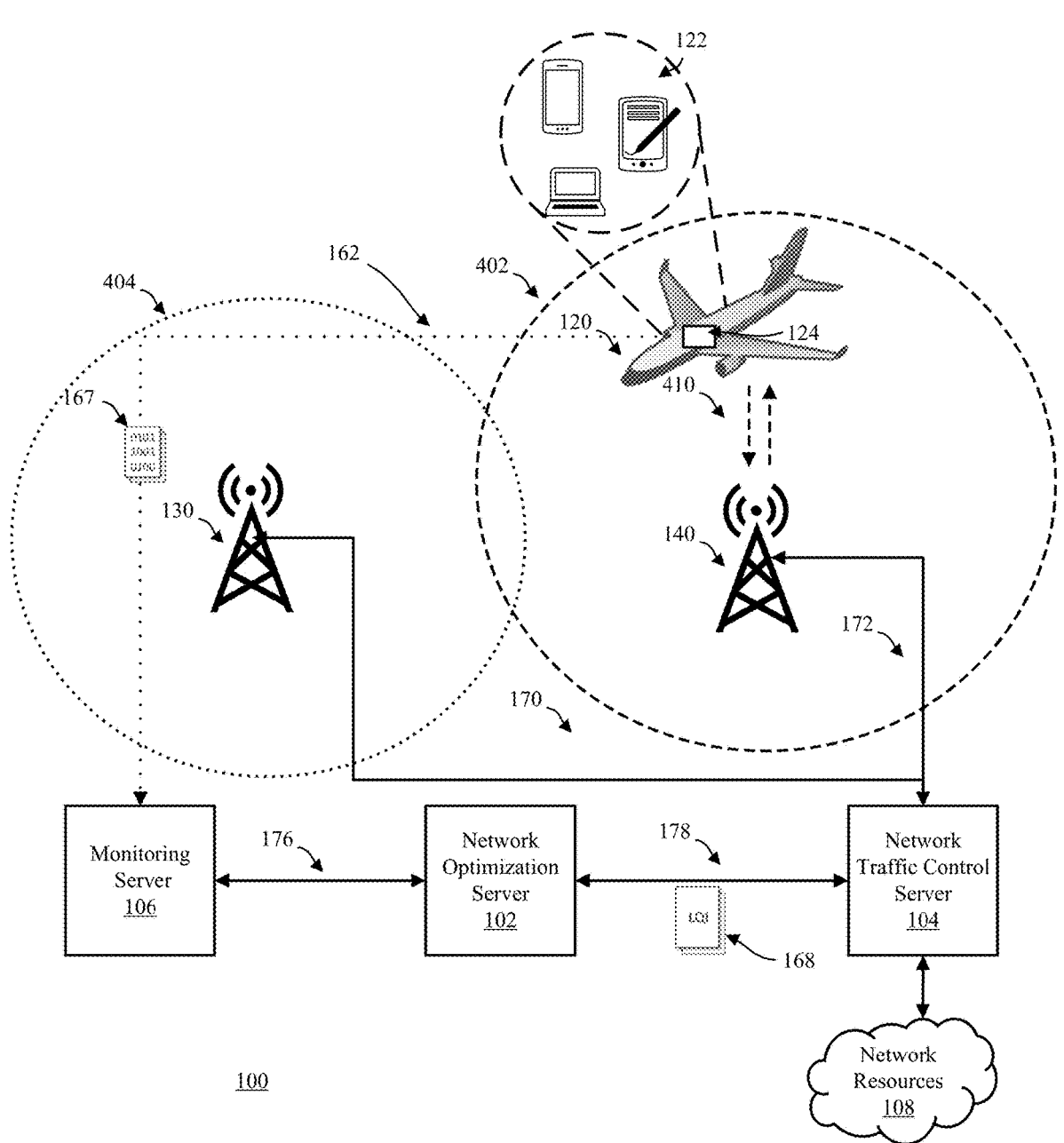
FIG. 4A-4D depict a vehicle traveling between cells in a vehicle communication network environment according to aspects of the present disclosure.

FIG. 4A depicts the aircraft 120 located within the boundaries of cell 402. The on-board node 124 may be connected to base station 140 via external communication link 410. Base station 140 may be any type of cellular base station, such as an LTE or 5G base station.

As illustrated, the distance between the aircraft 120 and the base station 140 is relatively short. As such, the performance metrics 167 for the external communication link 410 may be relatively good. Based upon the performance metrics 167, the network optimization server 102 may generate an LQI 168 of 6, and the network traffic control server 104 may apply shaper three 306 to the network traffic of computing devices 122.

Figure 4B:
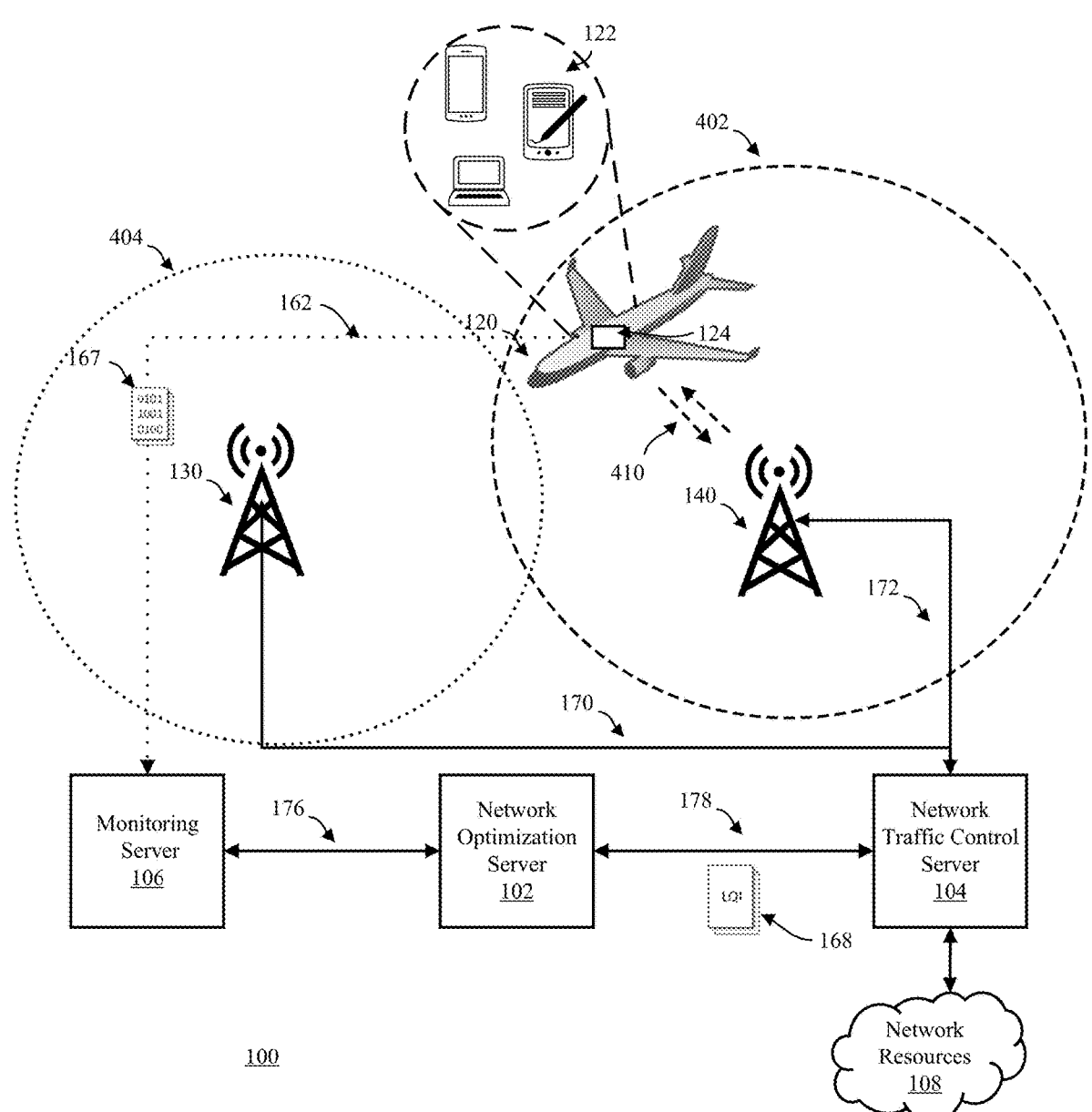

FIG. 4B depicts the aircraft 120 near the boundary of the cell 402. As illustrated, the distance between the aircraft 120 and the base station 140 has increased. As such, the performance metrics 167 for the external communication link 410 may have degraded. Based upon the performance metrics, the network optimization server 102 may generate an LQI 168 of 5, and the network traffic control server 104 may apply shaper two 304 to the network traffic of computing devices 122.

Figure 4C:
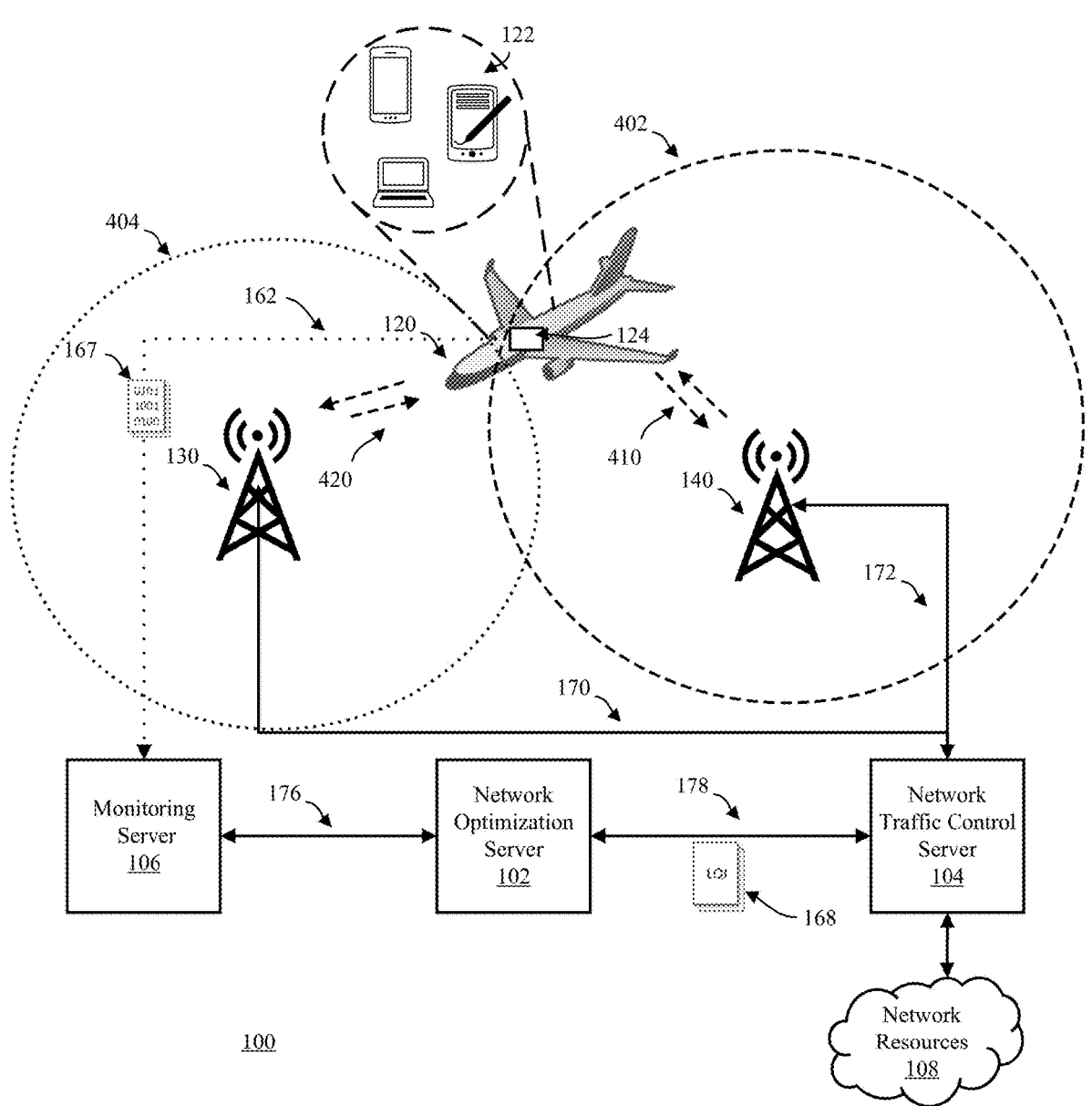

FIG. 4C depicts the aircraft 120 near the boundary of the cell 402 and the boundary of the cell 404. The on-board node 124 may be simultaneously connected to base station 140 via external communication link 410 and base station 130 via external communication link 420. Base station 130 may be any type of cellular base station, such as a 5G base station. The on-board node 124 may aggregate the bandwidth provided by external communication links 410 and 420. The on-board node 124 may calculate and transmit the performance metrics 167 for communication links 410 and 420 separately or as a single aggregate metric.

As illustrated, the distances between the aircraft 120 and the base stations 130 and 140 are relatively long. As such, the performance metrics 167 for the individual communication links 410 and 420 may be relatively poor. However, the aggregated performance metrics for both communication links 410 and 420 may be very good. Based upon the aggregated performance metrics, the network optimization server 102 may generate an LQI 168 of 10, and the network traffic control server 104 may apply shaper four 308 to the network traffic of computing devices 122.

Figure 4D:
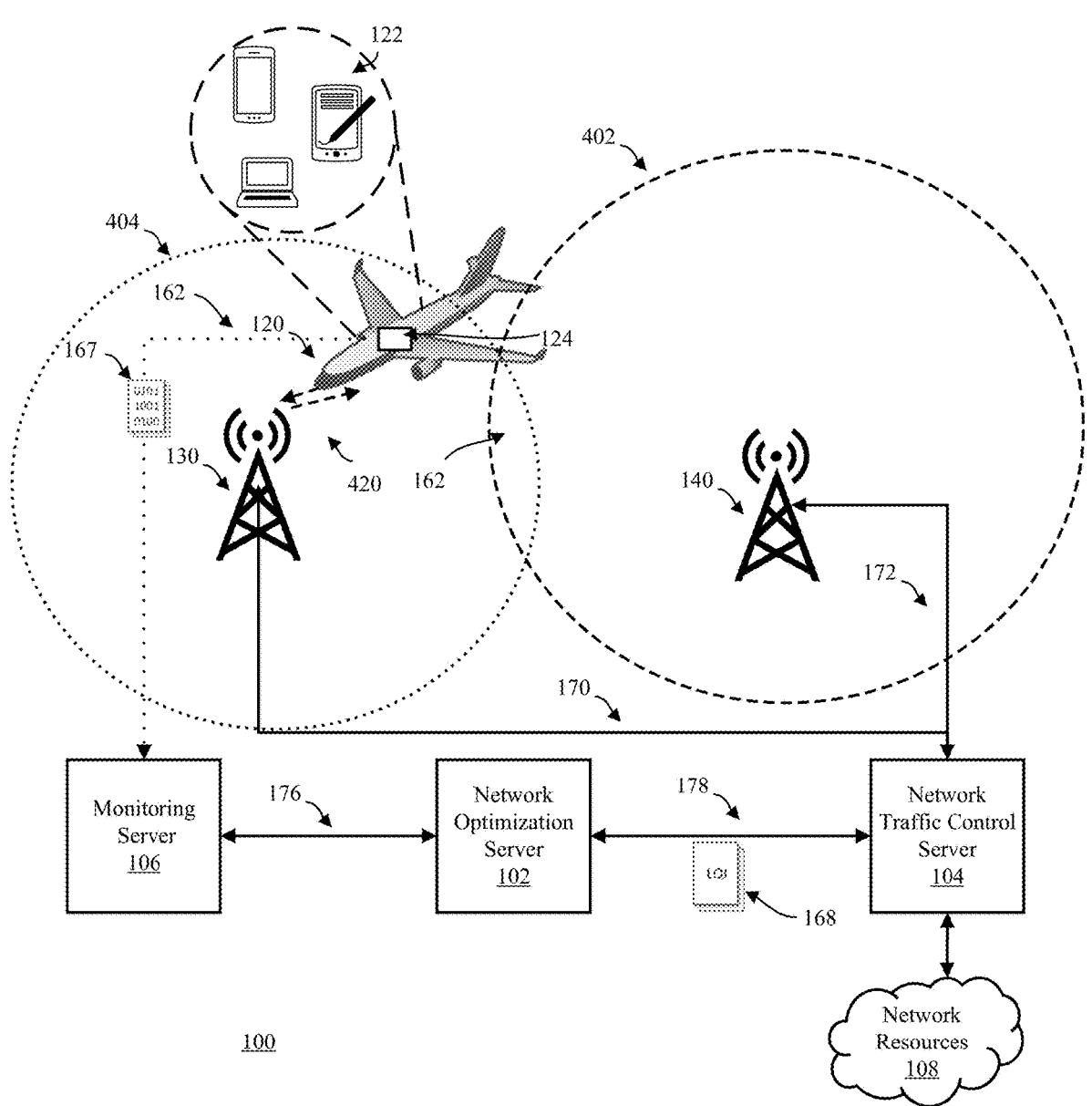

FIG. 4D depicts the aircraft 120 located within the boundaries of cell 404. The on-board node 124 may be connected to base station 130 via external communication link 420. As illustrated, the distance between the aircraft 120 and the base station 130 is relatively short. As such, the performance metrics 167 for the external communication link 420 may be relatively good. Based upon the performance metrics, the network optimization server 102 may generate an LQI 168 of 9, and the network traffic control server 104 may apply shaper four 308 to the network traffic of computing devices 122.

Exemplary Method of Dynamically Metering Network Bandwidth in a Vehicle Network

Figure 5:
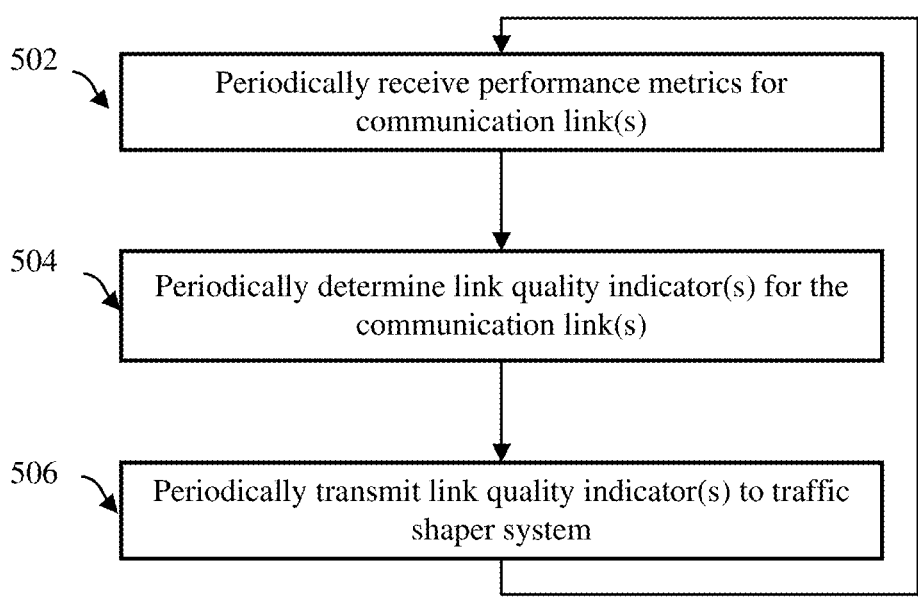
FIG. 5 depicts a flow diagram of an example method for performing dynamic traffic shaping.

FIG. 5 illustrates a flow diagram of an exemplary computer-implemented method 500 for dynamically metering network bandwidth in a vehicle network. One or more steps of the computer-implemented method 500 may be implemented as a set of instructions stored on a computer-readable memory and executable on one or more processors. The computer-implemented method 500 of FIG. 5 may be implemented via a system, such as the network optimization server 102, the network traffic control server 104, and/or the monitoring server 106. The computer-implemented method 500 may operate in conjunction with the scenarios and/or environments illustrated in FIGS. 1-4, and/or in other environments in which vehicles provide network access.

In one aspect, the computer-implemented method 500 may include at block 502 periodically receiving performance metrics for one or more communication links that support wireless communications for one or more networked computing devices onboard a vehicle. The performance metrics may be received by the monitoring server 106 or by the network optimization server 102. The performance metrics, e.g., performance metrics 166 and 167, may fluctuate over time. The performance metrics may be received in a time interval ranging from every 5 seconds to every 20 seconds. The performance metrics may be received from a modem onboard the vehicle, a monitoring server 106, a cellular base station, e.g., base stations 130 or 140, or a satellite base station, e.g., satellite base station 150. The communication links may comprise cellular, e.g., external communication links 132 and 142, or satellite, e.g., external communication link 152.

In one aspect, the computer-implemented method 500 may include at block 504 periodically determining an LQI 168 based upon the one or more performance metrics. The LQI 168 may be determined by the network optimization server 102. The LQI 168 may be a numerical score, e.g., 1 to 10, or a string. The LQI 168 may comprise an uplink quality indicator and a downlink quality indicator. Separate LQIs 168 may be determined for each communication link. An aggregate LQI 168 may be determined for a plurality of communication links.

In one aspect, the computer-implemented method 500 may include at block 506 periodically transmitting the LQI 168 to a traffic shaper system. If the LQI 168 has not changed since the previous transmission, this step may be omitted one or more times. The traffic shaper system may be the network traffic control server 104. Transmitting the LQI 168 may cause the traffic shaper system to dynamically allocate bandwidth among the one or more networked computing devices, e.g., computing devices 112 or 122, by applying a traffic shaper, e.g., shaper one 302, shaper two 304, shaper three 306, shaper four 308, etc. The traffic shaper system may dynamically allocate upload bandwidth based upon the uplink quality indicator and dynamically allocate download bandwidth based upon the downlink quality indicator. The traffic shaper system may comprise a deep packet inspection engine, e.g., DPI module 194. The traffic shaper system may dynamically allocate bandwidth based upon a priority assigned to one or more traffic types identified by the deep packet inspection engine. The traffic shaper system may dynamically reallocate bandwidth equally among the network computing devices when a network computing device joins or leaves the vehicle network. The traffic shaper system may dynamically allocate bandwidth equally among the network computing devices. The traffic shaper system may dynamically allocate bandwidth unequally based upon a priority of the one or more networked computing devices.

The computer-implemented method 500 may be repeated one or more times. It should be understood that not all blocks of the computer-implemented method 500 are required to be performed. Moreover, the computer-implemented method 500 is not mutually exclusive (i.e., block(s) from computer-implemented method 500 may be performed in any particular implementation).

ADDITIONAL CONSIDERATIONS

As used herein, the terms "receive," "received." and "receiving" may refer to collecting performance metrics transmitted by an on-board node and/or base station or retrieving the performance metrics from the on-board node and/or base station. It will be appreciated that the term receive is not limited to these examples only and may have alternative, different and/or other features and still fall within the scope of present disclosure.

As used herein, the terms "meter." "metered," and "metering" may refer to allocating bandwidth limits or enforcing the bandwidth limits. It will be appreciated that the term meter is not limited to these examples only and may have alternative, different and/or other features and still fall within the scope of present disclosure.

Use of "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise. A device or structure that is "configured" in a certain way is configured in at least that way but may also be configured in ways that are not listed.

Further, as used herein, the expressions "in communication," "coupled" and "connected," "communicatively coupled," etc. including variations thereof, encompasses direct communication and/or indirect communication through one or more intermediary components, and does not require direct mechanical or physical (e.g., wired) communication and/or constant communication, but rather additionally includes selective communication at periodic intervals, scheduled intervals, aperiodic intervals, and/or one-time events. The embodiments are not limited in this context.

Further still, unless expressly stated to the contrary, "or" refers to an inclusive or and not to an exclusive or. For example, "A, B or C" refers to any combination or subset of A, B, C such as (1) A alone, (2) B alone, (3) C alone, (4) A with B. (5) A with C. (6) B with C, and (7) A with B and with C. As used herein, the phrase "at least one of A and B" is intended to refer to any combination or subset of A and B such as (1) at least one A, (2) at least one B, and (3) at least one A and at least one B. Similarly, the phrase "at least one of A or B" is intended to refer to any combination or subset of A and B such as (1) at least one A, (2) at least one B, and (3) at least one A and at least one B.

Moreover, in the foregoing specification, specific embodiments have been described. However, one of ordinary skill in the art appreciates that various modifications and changes can be made in view of aspects of this disclosure without departing from the scope of the invention as set forth in the claims below. Accordingly, the specification and figures are to be regarded in an illustrative rather than a restrictive sense, and all such modifications made in view of aspects of this disclosure are intended to be included within the scope of present teachings.

Additionally, the benefits, advantages, solutions to problems, and any element(s) that may cause any benefit, advantage, or solution to occur or become more pronounced are not to be construed as a critical, required, or essential features or elements of any or all the claims.

Finally, any references, including, but not limited to, publications, patent applications, and patents cited herein are hereby incorporated in their entirety by reference to the same extent as if each reference were individually and specifically indicated to be incorporated by reference and were set forth in its entirety herein.

The patent claims at the end of this patent application are not intended to be construed under 35 U.S.C. § 112(f) unless traditional means-plus-function language is expressly recited, such as "means for" or "step for" language being explicitly recited in the claim(s). The communication systems and methods described herein are directed to improvements to computer and communication system functionality and performance.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

This detailed description is to be construed as exemplary only and does not describe every possible embodiment, as describing every possible embodiment would be impractical, if not impossible. One could implement numerous alternate embodiments, using either current technology or technology developed after the filing date of this application.

By way of example, and not limitation, the disclosure herein contemplates at least the following aspects:

1. A computer-implemented method for dynamically metering network bandwidth in a vehicle network, comprising: periodically receiving, by one or more processors, one or more performance metrics of one or more communication links that support wireless communications for one or more networked computing devices onboard a vehicle, wherein the one or more performance metrics fluctuate over time; periodically determining, by the one or more processors, a link quality indicator based upon the one or more performance metrics; and periodically transmitting, by the one or more processors, the link quality indicator to a traffic shaper system to cause the traffic shaper system to dynamically allocate bandwidth among the one or more networked computing devices based upon the link quality indicator.

2. The method of aspect 1, wherein the periodically receiving the one or more performance metrics further comprises periodically receiving the one or more performance metrics from a modem onboard the vehicle.

3. The method of any combination of aspects 1 or 2, wherein the periodically receiving the one or more performance metrics further comprises periodically receiving the one or more performance metrics from a monitoring server.

4. The method of any combination of aspects 1-3, wherein the periodically receiving the one or more performance metrics further comprises periodically receiving the one or more performance metrics from a base station.

5. The method of any combination of aspects 1-4, wherein at least one of the one or more communications links comprises a cellular communications link or a satellite communications link.

6. The method of any combination of aspects 1-5, wherein at least one of the one or more communications links comprises a cellular communications link.

7. The method of any combination of aspects 1-6, wherein at least one of the one or more communications links comprises a satellite communications link.

8. The method of any combination of aspects 1-7, wherein the link quality indicator comprises an uplink quality indicator and a downlink quality indicator, and dynamically allocating bandwidth comprises dynamically allocating upload bandwidth based upon the uplink quality indicator and dynamically allocating download bandwidth based upon the downlink quality indicator.

9. The method of any combination of aspects 1-8, wherein the traffic shaper system comprises a deep packet inspection engine, and dynamically allocating bandwidth among the one or more networked computing devices based upon a priority assigned to one or more traffic types identified by the deep packet inspection engine.

10. The method of any combination of aspects 1-9, further comprising dynamically reallocating bandwidth equally among the one or more networked computing devices when a networked computing device joins or leaves the vehicle network.

11. The method of any combination of aspects 1-10, wherein dynamically allocating bandwidth among the one or more networked computing devices comprises dividing the bandwidth equally among the one or more computing devices.

12. The method of any combination of aspects 1-10, wherein dynamically allocating bandwidth among the one or more networked computing devices comprises dividing the bandwidth unequally based upon a priority of the one or more networked computing devices.

13. A ground station system for dynamically metering network access in a vehicle network, the ground station system comprising: one or more processors; and one or more non-transitory memories storing instructions that, when executed by the one or more processors, cause the ground station system to: periodically receive one or more performance metrics of one or more communication links that support wireless communications for one or more networked computing devices onboard a vehicle, wherein the one or more performance metrics fluctuate over time; periodically determine a link quality indicator based upon the one or more performance metrics; and periodically transmit the link quality indicator to a traffic shaper system to cause the traffic shaper system to dynamically allocate bandwidth among the one or more networked computing devices based upon the link quality indicator.

14. The ground station system of aspect 13, wherein the ground station system is configured to periodically receive the one or more performance metrics from a modem onboard the vehicle.

15. The ground station system of any combination of aspects 13 or 14, wherein the ground station system is configured to periodically receive the one or more performance metrics from a monitoring server.

16. The ground station system of any combination of aspects 13-15, wherein the ground station system is configured to periodically receive the one or more performance metrics from a base station.

17. The ground station system of any combination of aspects 13-16, wherein the ground station system is configured to periodically receive the one or more performance metrics of the one or more communication links that comprise a cellular communications link or a satellite communications link.

18. The ground station system of any combination of aspects 13-17, wherein the ground station system is configured to periodically receive the one or more performance metrics of the one or more communication links that comprise a cellular communications link.

19. The ground station system of any combination of aspects 13-17, wherein the ground station system is configured to periodically receive the one or more performance metrics of the one or more communication links that comprise a satellite communications link.

20. The ground station system of any combination of aspects 13-19, wherein the link quality indicator comprises an uplink quality indicator and a downlink quality indicator, and dynamically allocating bandwidth comprises dynamically allocating upload bandwidth based upon the uplink quality indicator and dynamically allocating download bandwidth based upon the downlink quality indicator.

21. The ground station system of any combination of aspects 13-20, wherein the traffic shaper system comprises a deep packet inspection engine, and the traffic shaper system is configured to dynamically allocate bandwidth among the one or more networked computing devices based upon a priority assigned to one or more traffic types identified by the deep packet inspection engine.

22. The ground station system of any combination of aspects 13-21, wherein the traffic shaper system is configured to dynamically reallocate bandwidth among the one or more networked computing devices when a networked computing device joins or leaves the vehicle network.

23. The ground station system of any combination of aspects 13-22, wherein the traffic shaper system is configured to dynamically allocate bandwidth among the one or more networked computing devices by dividing the bandwidth equally among the one or more computing devices.

24. The ground station system of any combination of aspects 13-22, wherein the traffic shaper system is configured to dynamically allocate bandwidth among the one or more networked computing devices by dividing the bandwidth unequally based upon a priority of the one or more networked computing devices.

What is claimed:

1. A computer-implemented method, comprising:

periodically receiving, by one or more processors of a station system, one or more performance metrics of one or more communication links that support wireless communications for one or more networked computing devices onboard a vehicle, wherein the one or more performance metrics fluctuate over time;

periodically determining, by the one or more processors, a link quality indicator based at least in part on the one or more performance metrics;

periodically transmitting, by the one or more processors, the link quality indicator to a traffic shaper system of the station system; and dynamically allocating, using to cause the traffic shaper system, bandwidth among the one or more networked computing devices based at least in part on the link quality indicator, wherein the traffic shaper system comprises a plurality of traffic shapers each corresponding to a respective link quality indicator of a plurality of candidate link quality indicators, and wherein dynamically allocating the bandwidth uses a subset of one or more traffic shapers from among the plurality of traffic shapers based at least in part on the link quality indicator.

2. The method of claim 1, wherein the periodically receiving the one or more performance metrics further comprises periodically receiving the one or more performance metrics from a modem onboard the vehicle.

3. The method of claim 1, wherein the periodically receiving the one or more performance metrics further comprises periodically receiving the one or more performance metrics from a monitoring server.

4. The method of claim 1, wherein the periodically receiving the one or more performance metrics further comprises periodically receiving the one or more performance metrics from a base station.

5. The method of claim 1, wherein at least one of the one or more communication links comprises a cellular communication link or a satellite communication link.

6. The method of claim 1, wherein the link quality indicator comprises an uplink quality indicator and a downlink quality indicator, and dynamically allocating the bandwidth comprises dynamically allocating upload bandwidth based at least in part on the uplink quality indicator and dynamically allocating download bandwidth based at least in part on the downlink quality indicator.

7. The method of claim 1, wherein the traffic shaper system comprises a deep packet inspection engine, and dynamically allocating the bandwidth among the one or more networked computing devices is based at least in part on a priority assigned to one or more traffic types identified by the deep packet inspection engine.

8. The method of claim 1, further comprising dynamically reallocating the bandwidth equally among the one or more networked computing devices when a networked computing device joins or leaves a vehicle network of the vehicle.

9. The method of claim 1, wherein dynamically allocating the bandwidth among the one or more networked computing devices comprises dividing the bandwidth equally among the one or more networked computing devices.

10. The method of claim 1, wherein dynamically allocating the bandwidth among the one or more networked computing devices comprises dividing the bandwidth unequally based at least in part on a priority of the one or more networked computing devices.

11. A ground station system, comprising:

one or more processors; and one or more non-transitory memories storing instructions that, when executed by the one or more processors, cause the ground station system to:

periodically receive one or more performance metrics of one or more communication links that support wireless communications for one or more networked computing devices onboard a vehicle, wherein the one or more performance metrics fluctuate over time;

periodically determine a link quality indicator based at least in part on the one or more performance metrics;

periodically transmit the link quality indicator to a traffic shaper system of the ground station system; and dynamically allocate, using the traffic shaper system, bandwidth among the one or more networked computing devices based at least in part on the link quality indicator, wherein the traffic shaper system comprises a plurality of traffic shapers each corresponding to a respective link quality indicator of a plurality of candidate link quality indicators, and wherein dynamically allocating the bandwidth uses a subset of one or more traffic shapers from among the plurality of traffic shapers based at least in part on the link quality indicator.

12. The ground station system of claim 11, wherein the ground station system is configured to periodically receive the one or more performance metrics from a modem onboard the vehicle.

13. The ground station system of claim 11, wherein the ground station system is configured to periodically receive the one or more performance metrics from a monitoring server.

14. The ground station system of claim 11, wherein the ground station system is configured to periodically receive the one or more performance metrics from a base station.

15. The ground station system of claim 11, wherein the ground station system is configured to periodically receive the one or more performance metrics of the one or more communication links that comprise a cellular communications link or a satellite communications link.

16. The ground station system of claim 11, wherein the link quality indicator comprises an uplink quality indicator and a downlink quality indicator, and dynamically allocating the bandwidth comprises dynamically allocating upload bandwidth based at least in part on the uplink quality indicator and dynamically allocating download bandwidth based at least in part on the downlink quality indicator.

17. The ground station system of claim 11, wherein the traffic shaper system comprises a deep packet inspection engine, and the traffic shaper system is configured to dynamically allocate the bandwidth among the one or more networked computing devices based at least in part on a priority assigned to one or more traffic types identified by the deep packet inspection engine.

18. The ground station system of claim 11, wherein the traffic shaper system is configured to dynamically reallocate the bandwidth among the one or more networked computing devices when a networked computing device joins or leaves a vehicle network of the vehicle.

19. The ground station system of claim 11, wherein the traffic shaper system is configured to dynamically allocate the bandwidth among the one or more networked computing devices by dividing the bandwidth equally among the one or more networked computing devices.

20. The ground station system of claim 11, wherein the traffic shaper system is configured to dynamically allocate the bandwidth among the one or more networked computing devices by dividing the bandwidth unequally based at least in part on a priority of the one or more networked computing devices.

\* \* \* \* \*